FREQUENCY CHANGER EMPLOYING OPTO-ELECTRONICS

Filed Jan. 2, 1968 2 Sheets-Sheet 1

INVENTOR
WILLIAM C. WAYNE, Jr.

BY William H. Brunig, Agent
Hurvitz, Rose & Greene
ATTORNEYS

FREQUENCY CHANGER EMPLOYING OPTO-ELECTRONICS

Filed Jan. 2, 1968

INVENTOR
WILLIAM C. WAYNE, Jr.

BY *William H. Benning, Agent*
*Kurtz, Rose & Greene*
ATTORNEYS

United States Patent Office 3,516,318

Patented June 23, 1970

3,516,318

FREQUENCY CHANGER EMPLOYING OPTO-ELECTRONICS

William C. Wayne, Jr., South Fort Mitchell, Ky., assignor to D. H. Baldwin Company, Cincinnati, Ohio, a corporation of Ohio Filed Jan. 2, 1968, Ser. No. 695,173
Int. Cl. G10h *1/00, 3/06*
U.S. Cl. 84—1.01 27 Claims

ABSTRACT OF THE DISCLOSURE

A frequency changer including a transistorized ring sub-audio oscillator section and a modulator section, the oscillator having *n* stages and each stage arranged to drive a lamp. Optically coupled to each lamp is a photocell, each photocell having applied thereto a phased band of wide band audio signals from an *n* phase source of wide band audio signals. As the stages are energized to drive the lamps in sequence at the sub-audio frequency of the oscillator, the resistances of the corresponding photocells vary in accordance with the light emitted by the corresponding lamps to amplitude modulate the corresponding bands of signals applied thereto, the frequencies of the composite signal produced at a summing point being shifted by an amount equal to the sub-audio frequency of the oscillator. The ring oscillator is provided with a power supply which provides both DC and a choice of noise or periodic variation, whereby the oscillators are frequency modulated. Separate sub-bands (of the audio band) derived from bandpass filters either on an octave basis or on some other basis of division, may be shifted to different extents and in diverse random or periodic modes, so that the separate sub-bands are not only shifted in frequency by different constant amounts but are also randomly or periodically modulated in frequency. The character of the random modulation may be controlled by a simple RC voicing filter.

BACKGROUND OF THE INVENTION

This invention relates generally to frequency changers, and more particularly to frequency changers including a ring oscillator in an opto-electronic modulator, wherein adjustments of the oscillator and modulator are non-interacting.

In U.S. Pat. 3,004,460, issued to W. C. Wayne, Jr. and assigned to the same assignee as the present invention, there is shown and described a system for achieving ensemble effect in music by processing a band of audio frequencies. The system employs modulator-oscillators comprising vacuum tube-type, three-stage, RC-coupled ring oscillators, three phase audio signals being applied to different ones of the respective grids of the oscillator tubes. The components of the oscillators are chosen such that the stages oscillate in ring fashion at sub-audio frequencies on the order of 0.5 to 15 c.p.s., to introduce the desired frequency shifts into the individual bands of signals and into the composite of these signals when combined at the output of the system.

In order to attain precision of operation of the system disclosed in that patent, one can select tubes for each modulator at the factory so that each tube will operate over the same range. Field replacement of tubes makes such factory practice of questionable long-term value. Furthermore, adjustment of the system of the patent is difficult because adjustment of components leading to distortion in the oscillator section of the system inevitably leads to modifications of the modulator section, i.e., if one adjusts the sub-audio gain or output of one tube relative to the others, the amplitude of the audio frequencies of one phase of the audio signal will also be simultaneously affected and not necessarily in a desired direction.

According to the present system, factory selection of transistors is sensible because these are long life components and need not normally be replaced in the field. But, in addition, the oscillator section of the system is optically coupled to the modulator section, so that the tow sections may be individually adjusted, each without interaction on the other.

It is well known (see U.S. Pat. 2,989,886 to Markowitz) that noise voltage applied to a tone oscillator at all or part of its supply power voltage will produce random variations of both frequency and amplitude of the output of the oscillator. In the present invention, noise may be applied as part of the power supply to the ring type oscillator of a frequency shifter. The oscillator then provides a randomly shifting frequency. The operating point of the transistors in the ring oscillator is shifted sufficiently so that their parameters are changed. These parameters determine the input and output impedances of the transistors which, in turn, affect the sub-audio frequency at which oscillations occur in the closed loop or "ring." The output of the oscillator modulator then is not only frequency shifted by a fixed average change of frequency, but the frequency shifted signal is also frequency modulated in a random manner, giving rise to a simulated wind noise in the final tonal product of the system. This wind noise simulates the random disturbances of the air jet in an organ pipe flue. To the extent that the noise voltage upsets the precise balance of the oscillator-modulator sections, there may also be produced some incidental amplitude modulation of the audio signals as a second-order effect.

Selectively, a periodic voltage, which may be of vibrato frequency, may also be applied as part of the power supply to the ring oscillator of a frequency shifter. The oscillator then provides a periodically shifting frequency.

By shifting diverse octaves differently, and applying a greater frequency shift to the higher frequency octaves, the stretched, non-harmonic modes of a pipe resonator body are simulated.

SUMMARY OF THE INVENTION

A frequency changer according to the invention includes an *n*-stage oscillator, wherein *n* is greater than two and wherein each stage thereof drives a light-emitting element. Optically coupled to each of the light-emitting elements is a photo-resistor device, each such device having an output connected to a summing point and an input arranged to have applied thereto a wide band of signals from an *n*-phase source. As the stages are energized in a predetermined sequence at a sub-audio frequency to drive the light-emitting elements, the resistances of the corresponding light-responsive devices vary in accordance with the varying amount of light impinging thereon to amplitude modulate the wide bands of signals respectively applied thereto. The composite signal produced at the summing point will be higher or lower in frequency by an amount equal to the sub-audio frequency of the oscillator, and the shift will have an algebraic sign depending on the relative phasing of the signal source spectra constituting an *n*-phase system with respect to the sub-audio frequency phase sequence of the oscillator. A filter having band pass characteristics is provided at the output of each shifter so as to effectively determine the amount of shift which appears in each audio sub-band in the final output of a complete system. This final output is constituted of a number of adjacent sub-bands so as to yield a wide-band output. The shifts provided may be periodically or randomly varied.

DESCRIPTION OF PREFERRED EMBODIMENTS

Figure 1:
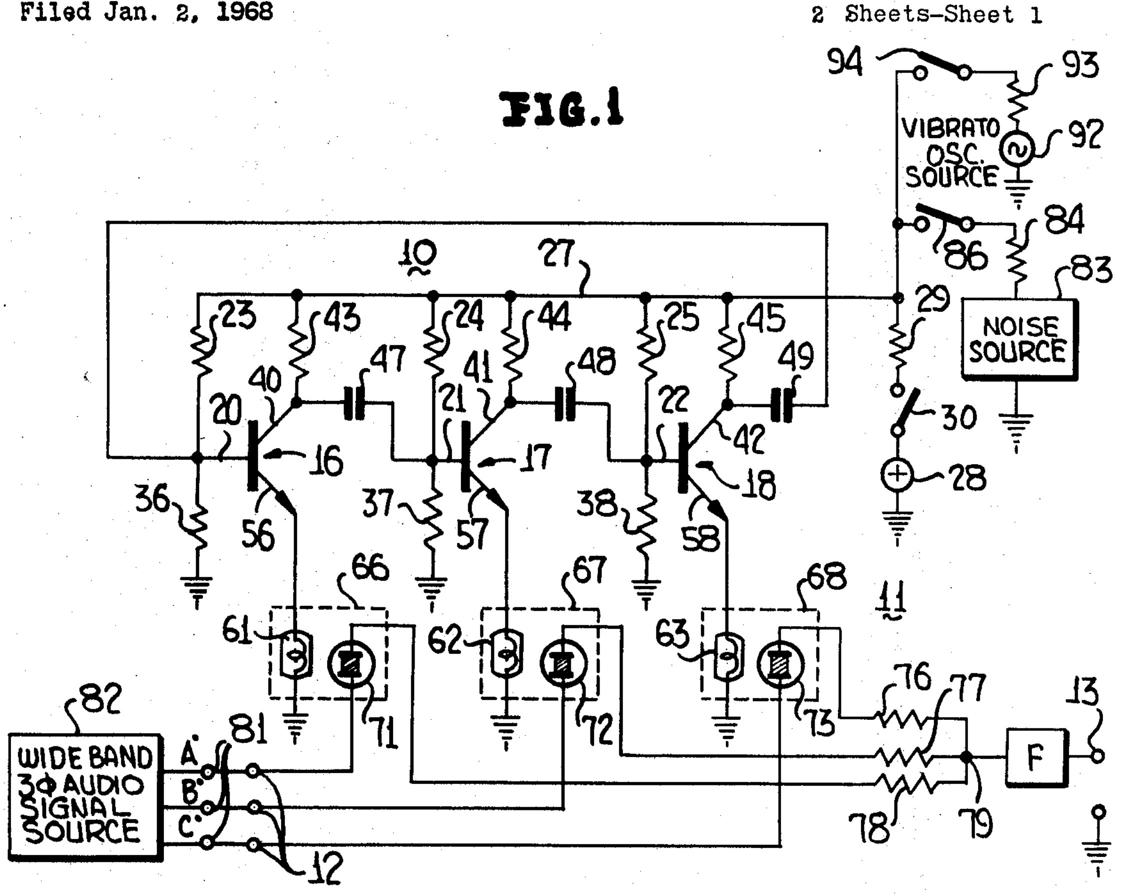
FIG. 1 is a schematic circuit diagram of a frequency changer employing opto-electronics according to the invention.

In FIG. 1, a frequency shifter according to the invention, includes an oscillator section 10, operatively associated with a modulator section 11, the frequency shifter having a plurality of input terminals 12 and an output terminal 13.

Oscillator section 10 is a ring type oscillator including NPN transistors 16–18 arranged in a cascaded closed-ring configuration, each transistor being connected for common emitter operation. The bases 20–22, respectively, of the transistors are connected via biasing resistors 23–25, respectively, to a common lead 27, the common lead in turn being connected to a positive potential source 28 via an isolating resistor 29 and a switch 30. The bases 20–22 of the respective transistors are also connected via biasing resistors 36–38, respectively, to the negative side of potential sourrce 28 through ground. The collectors 40–42, respectively, of the transistors are connected via resistors 43–45, respectively, to common lead 27. The collectors are also connected via capacitors 47–49, respectively, to the bases of the next transistors in the ring, e.g. collector 40 is connected via capacitor 47 to base 21, collector 41 via capacitor 48 to base 22, and collector 42 via capacitor 49 to base 20.

The emitters 56–58 of the respective transistors are connected via resistance lamps 61–63, respectively, to ground. The lamps can be for example model ML202A lamps, manufactured by Sylvania Electric Products Company, which are designed to operate directly from transistors and which have adequate frequency response for the purpose of the invention.

Considering the operation of oscillator 10 independently of modulator 11, the resistors and capacitor for each stage (each stage is designed around one of the transistors) are chosen such that transistors 16–18 attain full dynamic emitter-current amplitudes in sequence around the ring at a predetermined frequency of oscillation, the frequency of oscillation being determined mainly by the values of the capacitors and the base-biasing resistors, e.g. capacitor 47 and resistors 24 and 37 for transistor 17, etc.

Modulator 11 includes housings 66–68, each having one of the lamps 61–63 disposed therein, so that the lamps can illuminate the photosensitive surfaces of the corresponding photo-resistive devices 71–73. The housings are constructed so as to preclude any external light from affecting the devices therein, and can be described as "light-tight" housing.

The respective photo-resistive devices 71–73 each has one of its terminals connected via one of resistors 76–78 to a summing point 79, which is connected to output terminal 13, via band-pass filter F and its other terminal connected to one of the respective input terminals 12. Input terminals 12 are respectively connectable to the output terminals 81 of a wide-frequency-band, three-phase source 82 of identical bands of audio frequency signals, the source providing at output terminals 81 three signals of identical frequency content and identical amplitude, which are displaced 120° in time phase one from the other. For example, signal source 82 can include an audio frequency source and phase splitter, which produces identical signals $\dot{A}$, $\dot{B}$ and $\dot{C}$ displaced 120° one from the other, according to the teachings of the above-mentioned U.S. Pat. No. 3,004,460.

In the operation of the frequency changer circuit of the invention, the phase-split signals $\dot{A}$, $\dot{B}$, and $\dot{C}$ are applied to the respective photo-resistive devices 71–73, the photo-resistive devices having each a predetermined unmodulated resistance corresponding with DC energization of lamps 61–63.

Consider first that the oscillator 10 is quiescent, and that all stages are equally conductive. Under these conditions, signals $\dot{A}$, $\dot{B}$, and $\dot{C}$ are combined without any amplitude modulation at summing point 79 to produce zero output signal because the source 82 is a precisely balanced 3-phase system.

Consider now that sub-audio frequency oscillations have built up so that transistors 16–18 are being rendered sinusoidally conductive in sequence about the ring at a sub-audio frequency. For example, the R-C components of each stage of oscillator 10 may be chosen to give 60 degrees phase shift at 7 c.p.s. so that the transistors are energized in sequence around the ring at a 7 c.p.s frequency. Thus, the lamps 61–63 connected respectively in the emitter circuits of transistors 16–18 are illuminated in sequence about the ring at a 7 c.p.s. frequency, each sinusoidally.

As the lamps are rendered conductive in sequence around the ring, the corresponding photo-resistors are illuminated more and less intensely, cyclically and sinusoidally with respect to a DC value, at the frequency of the oscillator. Thereby, the photo-resistors function as variable resistors as illumination thereof varies. Thus, substantially sinusoidal amplitude modulation of the signals $\dot{A}$, $\dot{B}$, and $\dot{C}$ applied to the respective photocells 71–73 is achieved at a 7 c.p.s. frequency. When the amplitude-modulated signals $\dot{A}$, $\dot{B}$, and $\dot{C}$ are combined at summing point 79, all the frequencies of the composite output signal are shifted 7 c.p.s. higher or lower than their corresponding input frequencies derived from source 82 depending on the relative phasing of the three-phase audio signal source 82 with respect to the three-phase sub-audio amplitude modulating signals of oscillator 10. Ideally, the composite output signal at summing point 79 will contain no amplitude modulation.

From the above, it will be appreciated, that the frequency changer of the invention introduces at its common point 79, a frequency shifted version of the input bands of audio signals; that is, each frequency of the output band of signals is frequency shifted by the same amount, and the frequency shift will be either positive or negative depending upon the relative phase sequencing employed between the audio signal source 82 and the sub-audio modulating signal.

Figure 2:
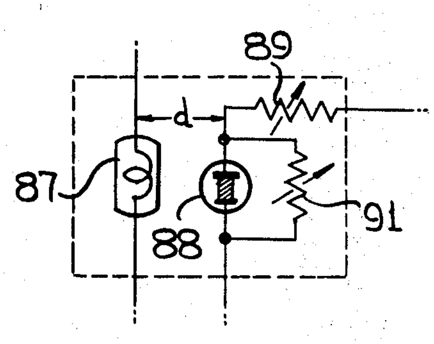
FIG. 2 is a schematic circuit diagram of a modification of a portion of the modulator section of the frequency changer of FIG. 1.

In an actual embodiment of a frequency changer according to the invention, the frequency of oscillation was 7 c.p.s., and the circuit was comprised of the following elements:

Transistors 16–18—General Electric, 2N2926
Lamps 71–73—Sylvania ML202A
Photocells 61–63—Clairex, CL503
Capacitors 47–49—2 microfarads
Resistors 23–25—82,000 ohms
Resistors 36–38—12,000 ohms
Resistors 43–45—430 ohms
Resistor 29—100 ohms
Supply voltage 28—16 volts Frequency changers according to the invention can advantageously be employed in systems for achiving an ensemble effect in music cf. U.S. Pat. 3,004,460, in place of the modulator-oscillator circuits 60 and 90–93 shown in FIG. 2 of that patent. Reference can be had to that patent for a detailed mathematical and phasor analysis of the theory of operation and that patent is hereby incorporated into this specification by reference.

In some situations in a music system of the type described in U.S. Pat. 3,004,460, it may be desired to effect something other than a uniform frequency shifting of the signals $\dot{A}$, $\dot{B}$, and $\dot{C}$ to achieve fringe tones or the like. For this purpose, a noise source 83, for example, is connected via an isolating resistor 84 and a switch 86 to common lead 27. When switch 86 is closed, the 7 c.p.s. oscillator frequency will be randomly frequency modulated about its otherwise steady oscillator frequency, and the composite signal at summing point 79 will accordingly contain frequency modulation.

In other situations in a music system of the type described in U.S. Pat. 3,004,460, it may be desired to effect a vibrato variation in the shifted frequencies to achieve multiple vibrato rates in different octave sub-bands, for example. For this purpose, a vibrato oscillator source 92, for example, is connected via an isolating resistor 93 and a switch 94 to common lead 27. When switch 94 is closed, the 7 c.p.s. oscillator frequency will be periodically frequency modulated about its otherwise steady oscillator frequency, and the composite signal at summing point 79 will accordingly contain frequency modulation at a vibrato rate.

The average resistance of the photocell devices can be controlled by varying the distance *d* between a particular lamp 87 and its corresponding photocell device 88 (see FIG. 2). Assuming equal quiescent light levels in the respective lamps and that the distance *d* has been adjusted to achieve equal average resistance for the respective photocells, the ultimate minimum and maximum resistance seen by the audio signals applied to the photocell devices can be controlled by connecting a resistor 89 in series with the photocell device and a resistance 91 in parallel with the photocell device. In this manner, the balancing of the stages of the modulator section can be more readily controlled.

From the foregoing, it will be appreciated that the oscillator section and the modulator section of the frequency changer of the invention are independent of each other to the extent that they can be independently balanced and otherwise adjusted. Also, the use of long life transistors having similar characteristics permits the use of factory selection of the biasing resistors for the transistors.

The light produced by any lamp, as 61, can only vary about some mean amplitude established by the steady DC current supplied by its associated transistor, as 16. The average value of the steady or DC resistance of the associated photo-resistor 71 and its variations of resistance is thus established. AC signal from one of terminals 12 is then applied in series with resistance 71, and that resistance serves to modulate the amplitude of the AC signal.

Figure 4:
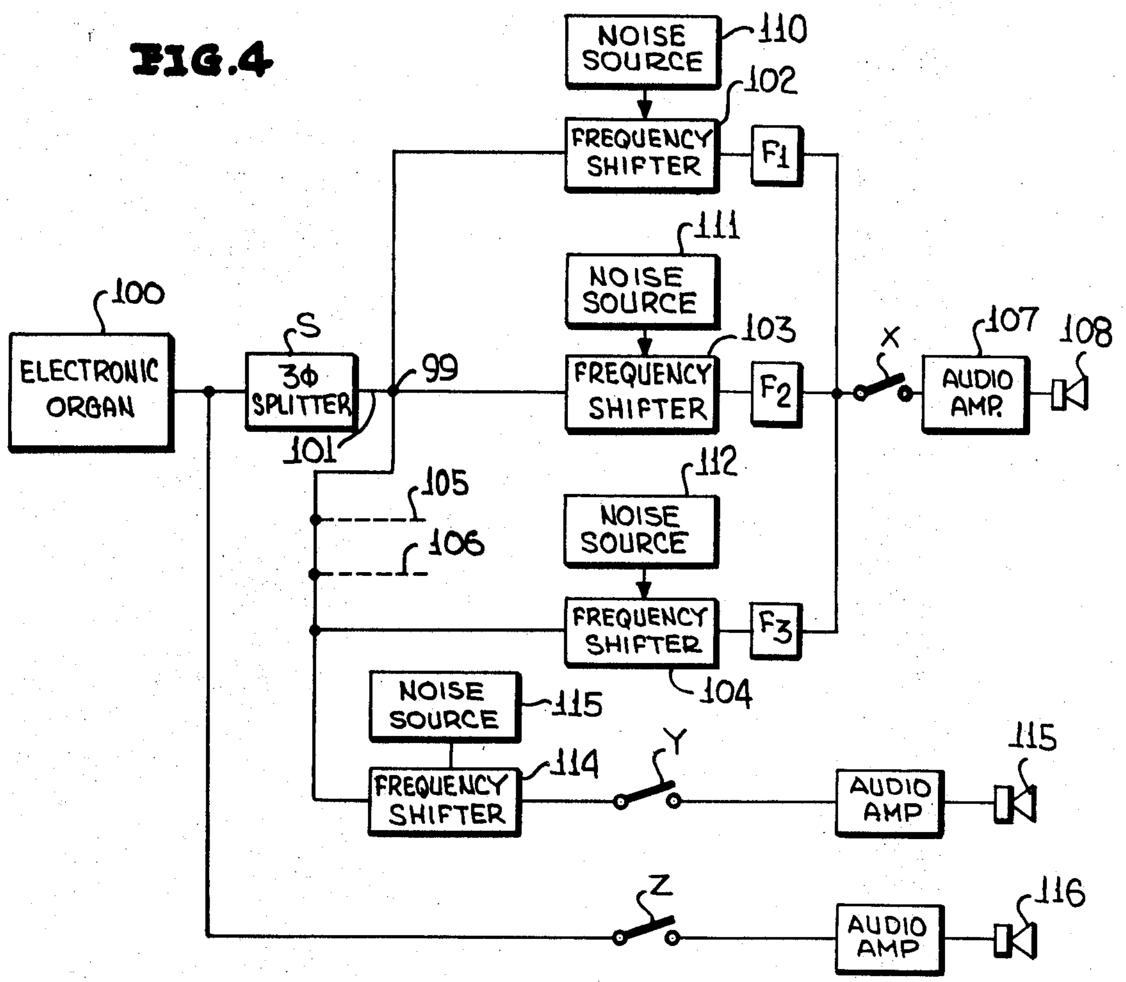
FIGS. 4 and 5 are block diagrams of systems employing the frequency changer of FIGS. 1 and 2.

In FIG. 4 is illustrated a typical system in which the invention of FIGS. 1 and 2 may be employed. The system follows that of Wayne Pat. No. 3,004,460 except for the provision of a noise power source, in each frequency shifter, and accordingly the system of FIG. 4 is described only briefly. While separate noise sources are shown for the separate frequency shifters, it is feasible to employ a common noise supply, since the oscillators all operate at diverse frequencies bearing no precise phasal relation to one another, but it is preferable to introduce many degrees of freedom.

In FIG. 4, 100 is an electronic organ or other source of electrical signals representing a band of audio music which is to be processed. The output of organ 100 is applied to a three-phase splitter, S, providing at 101 (it being understood that the three conductors required for the three-phase output of S are being represented by a single line) three bands of frequencies which are duplicates except for phase separations of 120° at each frequency. These three bands are applied in parallel, as at 99, to each of three frequency shifters 102, 103, 104 which introduce diverse frequency shifts, say of about 3 c.p.s., 5.5 c.p.s., 10 c.p.s. and other channels may be added as indicated by lines 105, 106. The phase shifters are intended to shift frequency on a per octave basis, at about 0.5% of the center frequency of the band, as taught in Wayne Pat. No. 3,004,460. From the outputs of the frequency shifters, which are arranged according to the teachings of FIGS. 1 and 2 of this application, separate octaves are derived by means of band-pass filters F1, F2, F3, etc., and the outputs of the latter are combined and applied to audio amplifier 107 and loudspeaker 108 via switch X. Each of frequency shifters 102, 103, 104 is supplied with a separate noise source, as 110, 111, 112, according to the teaching of FIG. 1. It follows that each octave is not only differently shifted on a steady state basis but that each shift is slightly frequency modulated on a random basis. The random noise can, of course, be filtered to vary its character and thereby the character of the modulations produced, and these are tailored to sound like organ pipe wind noise.

The output of phase splitter S is also applied to frequency shifter 114 and noise source 115, which introduces a very slight shift, say 0.5 c.p.s., insufficient to detune the organ tones appreciably. The output of shifter 114 is radiated at will by loudspeaker 115 via switch Y, and its primary function is to introduce wind noise. The unmodulated output of organ 100 may also be radiated at loudspeaker 116, at will, via switch Z (Speaker 116 of this application corresponds with speaker 23 of Wayne 3,004,460.)

The system of FIG. 4 has wide capability. The output of organ 100 can be radiated without processing via speaker 116, all other speakers being disabled. On the other hand, the output of organ 100 may be noise modulated in frequency, without other significant changes, by enabling speaker 115 and disabling speakers 108, 116. Again, ensemble effect is available from speaker 108, in combination with speaker 116. A full organ effect can be simulated by employing all three loudspeakers simultaneously. Peferably, these loudspeakers are located in spatially separated positions to achieve desirable acoustic mixing.

Figure 3:
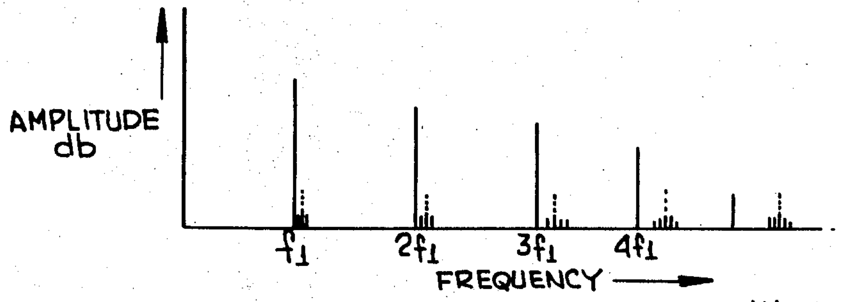
FIG. 3 is a plot of the frequency spectrum producible by the system of FIG. 4.

Referring now to FIG. 3 of the accompanying drawings, one may analyze the spectrum produced when organ 100 provides one complex tone, having a fundamental *f*1, and higher partials *f*2, *f*3 . . . . Each partial occurs in a different octave and is therefore, in the system of FIG. 4, shifted on the average by a different amount. However, the shift has side bands due to random frequency modulation and incidentally-varying amplitudes represented by the dotted extension of the center frequency of the shift fringe.

Figure 5:
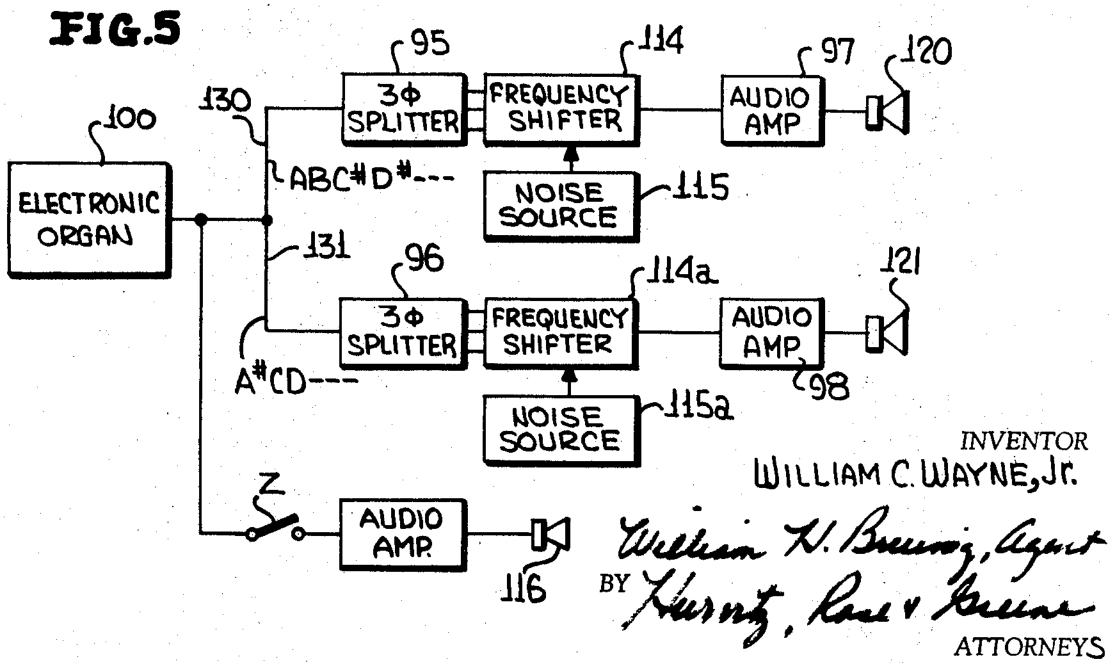

In FIG. 5, frequencies are separated on a note nomenclature basis, instead of on an octave basis. In either case the division is on a sub-band basis, in FIG. 4 the sub-bands being octave sub-bands following the shifters and in FIG. 5 being sub-bands on a note nomenclature basis preceding the shifters.

In the system of FIG. 5, all the notes of an organ 100 are divided into two groups, on two buses. Bus 130 carries notes A, B, C♮, D♮, F, G, while bus 131 carries notes A♮, C, D, E, F♮, G♮, so that alternate semi-tones in the musical scale are on alternate buses. The contents of each bus then extend over the audio band. The two audio bands are split into three-phase systems by splitters 95, 96 and are modulated by separate noise-controlled frequency shifters 114, 115 and **114*a*, 115*a*, which may have the same or different average shifts and which operate from separate independent noise power sources, arranged to produce both random frequency modulations of the shifts and incidental random amplitude modulations of the output bands. The separate sub-bands are radiated via separate audio amplifiers 97, 98 and well-separated loudspeakers 120, 121**.

While I have described and illustrated one specific embodiment of my invention, it will be clear that variation of the details of construction which are specifically illustrated and described may be resorted to without departing from the spirit and scope of the invention as defined in the appended claims.

What is claimed is:

1. A frequency changer circuit comprising:

an $n$ stage means for producing $n$ phase modulating frequencies, wherein $n$ is greater than 2, a plurality of light emitting means, each of said light emitting means being respectively operatively associated with and energizable to produce light by a different one of said stages of said $n$ stage means; and a plurality of optically variable resistance means, each of said variable resistance means being optically coupled to a different one of said light emitting means, the resistance of each of said resistance means being variable with the amount of light impinging thereon, each of said resistance means having a first terminal connectible to receive one phase of an $n$ phase source of identical bands of audio-frequency signals and a second terminal connected to a summing point, wherein, as each light emitting means is energized in response to the energization of the corresponding stage of said $n$ stage means, the resistance of the corresponding variable resistance means varies in accordance with the varying amount of light impinged thereon by its corresponding light emitting means to amplitude modulate the audio-frequency signal applied thereto.

2. A frequency changer circuit according to claim 1 wherein said modulating frequency producing means is an $n$ stage ring oscillator.

3. A frequency changer circuit according to claim 1 wherein a source of random frequencies is operatively connected to modulate the modulating frequencies.

4. A frequency changer circuit according to claim 1 wherein a source of periodic frequencies is operatively connected to modulate the modulating frequencies.

5. A system for frequency shifting a band of audio frequency signals representative of music, speech, and the like comprising means for producing from a band of audio frequency signals $n$ further identical bands of audio frequency signals relatively displaced in $n$ equal phases, where $n$ is greater than 2.

an $n$ stage oscillator means wherein the stages are energized in sequence at a predetermined modulating frequency, a plurality of light producing means, each of said light producing means being respectively operatively associated with a different one of said stages of said oscillator means, a plurality of light responsive means variable in resistance with variations in light impinged thereon, each of said light responsive means being optically coupled to a different one of said light producing means, each of said light responsive means having a first terminal and a second terminal, and a summing point, said first terminal of each light responsive means being connectible to receive a respective one of said identical bands of audio signals, and said second terminal of each of said light responsive means being connected to said summing point, wherein as each light emitting means is energized in response to the energization of the corresponding stage of said oscillator means, the resistance of the corresponding light responsive means varies in accordance with the varying amount of light impinging thereon from said light emitting means to amplitude modulate the respective band of audio frequency signals applied thereto.

6. A frequency shifting system according to claim 5 wherein each oscillator stage comprises transistors connected for common emitter operation, and wherein said light emitting means are connected in the emitter circuits of said transistors.

7. A frequency shifting system according to claim 5 wherein a source of random frequencies is connected to the supply voltage for the oscillators.

8. A frequency shifting system according to claim 5 wherein a source of periodic frequencies is connected to the supply voltage for the oscillators.

9. A frequency changer circuit, comprising a ring oscillator section and a modulation section:

said oscillator section comprising $n$ oscillator stages which are energizable around the ring at a predetermined modulating frequency, each stage of said oscillator including a transistor and a lamp, said lamp being operatively arranged to be energized by said transistor when rendered conductive;

said modulator section comprising a plurality of photocell devices, each of said photocell devices being optically coupled with one of said lamps, each of said photocell devices having a resistance which varies with light impinged thereon by its corresponding lamp, each of said photocell devices having a first terminal connectible to receive one phase of an $n$ phase source of identical bands of audio frequency signals and a second terminal connected to a summing point.

10. In a music system, a source of electrical signals representing organ tones, a single sideband frequency shifter means connected in cascade with said source for introducing a shift in one sense only into all the frequencies of said electrical signals, thereby to provide a frequency shifted band of frequencies, and means for modulating the frequency of said shift.

11. The combination according to claim 10 wherein said last means includes a source of supply voltage for said frequency shifter, said supply voltage having a random component.

12. The combination according to claim 10 wherein said last means includes a source of supply voltage for said frequency shifter, said supply voltage having a periodic component.

13. The combination according to claim 11 wherein said frequency shifter includes an $n$-phase oscillator oscillating at the frequency of said shift, where $n$ is greater than two.

14. In a music system, a source of multi-octave band of frequencies representing music, a separate single side band frequency shifter connected to separately modify the frequencies of each octave of said multi-octave band by introducing a shift of the frequencies of that octave in one sense only, to provide separate frequency shift octaves of said multi-octave band of frequencies, and means for differently randomly modulating the frequency shifts of each of said frequency shifted octaves of said multi-octave band of frequencies.

15. In an electronic organ system, means for separating the notes of the organ according to nomenclature on separate buses, where one of said buses carries all notes of nomenclature A, B, C♯, D♯, E, G and the other bus carries all notes of nomenclature A♯, C, D, E, F♯, G♯, and means for shifting the frequencies of the signals carried by said buses in separate frequency shifters to produce two frequency shifted bands, means for independently randomly modulating said shifts to produce two processed frequency bands, and means for separately acoustically radiating the two processed frequency bands.

16. In a music system, a source of multi-octave band frequencies representing music, a separate single sideband frequency shifter connected to separately modify the frequencies of each of plural sub-bands of said multi-octave band of frequencies in one sense only to provide separate frequency shifted sub-bands of said multi-octave band of frequencies, and means for differently randomly modulating the frequency shifts of each of said frequency shifted sub-bands.

17. The combination according to claim 16 wherein said single sideband frequency shifters include *n*-stage modulating ring oscillators, where *n* is greater than two, and an opto-electronic modulator connected to each stage of said *n*-stage modulating ring oscillator.

18. In an electronic organ system, means for separating the notes of the organ according to nomenclature on separate ones of plural buses, means for processing the frequency content of the signal carried by each of said buses to impart single side band frequency shifts to each, thereby to produce plural processed bands of signals, and means for randomly frequency modulating the shifts of the processed bands of signals.

19. The combination according to claim 18 wherein said means for processing includes opto-electronic oscillator modulators, including a separate *n*-phase modulating oscillator oscillating at the frequency of each of said shifts, and power supply systems for said oscillators, said power supply systems providing random noise supply voltage.

20. The combination according to claim 18 wherein said means for processing includes opto-electronic oscillator modulators, including a separate *n*-phase modulating oscillator oscillating at the frequency of each of said shifts, and power supply systems for said oscillators, said power supply systems providing periodic supply voltage.

21. An opto-electric frequency shift modulator, comprising

*n* modulatable light source, where *n* is at least three, means for modulating the light output of said light sources at the same nominal frequency but in relative phases separated by $360°/n$, a separate photo-resistor optically coupled to each of said light sources, a source of *n*-phase audio frequency, and means applying the separate phases of said *n*-phase audio frequency in series with separate ones of said photo-resistors to a common collection point.

22. The combination according to claim 21 wherein said means for modulating is a ring oscillator.

23. The combination according to claim 22 wherein said ring oscillator is a transistorized ring oscillator having one transistor per stage, and wherein said light sources are connected one for one as load devices for said transistors.

24. In a music system, a source of a multi-octave band of frequencies representing music, a plurality of frequency-shifting channels having a parallel coupling with said source, said channels comprising separate single side band frequency shifters to shift the frequencies in said channels each in one sense only, separate octave-band-pass filters in series with said single side band frequency shifters, modulating means operatively associated with said single side band frequency shifters for differently randomly modulating the frequency shifts of each of said channels as accomplished by said single side band frequency shifters, and utilization means for said shifted frequencies having a common coupling to said channels, whereby the separate octave bands may be differently frequency shifted.

25. In a music system, a source of a multi-octave band of frequencies representing music, a plurality of frequency-shifting channels having a parallel coupling with said source, said channels comprising separate single side band frequency shifters to shift the frequencies in said channels each in one sense only, separate octave-band-pass filters in series with said single side band frequency shifters, modulating means operatively associated with said single side band frequency shifters for differently periodically modulating the frequency shifts of each of said channels as accomplished by said single side frequency shifters, and utilization means for said shifted frequencies having a common coupling to said channels, whereby the separate octave bands may be differently frequency shifted.

26. In a music system, a source of a multi-octave band of frequencies representing music, a plurality of frequency-shifting channels having a parallel coupling with said source, said channels comprising, separate single side band frequency shifters to shift the frequencies of said channels each in one sense only, band-pass filters having different pass bands in series with said shifters, respectively, modulating means connected with said shifters for differently randomly modulating the frequency shifts of said channels as accomplished by said shifters, and utilization means for said shifted frequencies having a common coupling to said channels, whereby the bands may be differently frequency shifted.

27. In a music system, a source of a multi-octave band of frequencies representing music, a plurality of frequency-shifting channels having a parallel coupling with said source, said channels comprising, separate single side band frequency shifters to shift the frequencies of said channels each in one sense only, band-pass filters having different pass bands in series with said shifters, respectively, modulating means connected with said shifters for differently periodically modulating the frequency shifts of each of said channels as accomplished by said shifters, and utilization means for said shifted frequencies having a common coupling to said channels, whereby the bands may be differently frequency shifted.

References Cited

UNITED STATES PATENTS

| | | | |
|---|---|---|---|
| 2,916,706 | 12/1959 | Timperman | 331—57 X |
| 3,004,460 | 10/1961 | Wayne | 84—1.01 |
| 3,320,472 | 5/1967 | Tibbetts | 315—151 X |
| 3,378,623 | 4/1968 | Park | 84—1.18 |

HERMAN KARL SAALBACH, Primary Examiner

S. CHATMON, Jr., Assistant Examiner

U.S. Cl. X.R.

84—1.18, 1.25; 250—217; 331—22, 57